United States Patent
Le et al.

(10) Patent No.: US 10,148,671 B2
(45) Date of Patent: Dec. 4, 2018

(54) METHOD FOR PROTECTING A CHIP CARD AGAINST A PHYSICAL ATTACK INTENDED TO MODIFY THE LOGICAL BEHAVIOUR OF A FUNCTIONAL PROGRAM

(71) Applicant: MORPHO, Issy-les-Moulineaux (FR)

(72) Inventors: Thanh Ha Le, Issy-les-Moulineaux (FR); Julien Bringer, Issy-les-Moulineaux (FR); Louis-Philippe Goncalves, Issy-les-Moulineaux (FR); Maël Berthier, Issy-les-Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 0 days.

(21) Appl. No.: 14/413,860

(22) PCT Filed: Jul. 8, 2013

(86) PCT No.: PCT/EP2013/064368
§ 371 (c)(1),
(2) Date: Jan. 23, 2015

(87) PCT Pub. No.: WO2014/009307
PCT Pub. Date: Jan. 16, 2014

(65) Prior Publication Data
US 2015/0180882 A1    Jun. 25, 2015

(30) Foreign Application Priority Data

Jul. 10, 2012 (FR) .................................. 12 56618

(51) Int. Cl.
*H04L 29/06*    (2006.01)
*G06F 21/54*    (2013.01)
*G06F 21/77*    (2013.01)

(52) U.S. Cl.
CPC .............. *H04L 63/14* (2013.01); *G06F 21/54* (2013.01); *G06F 21/77* (2013.01)

(58) Field of Classification Search
CPC ..... H04L 63/14; H04L 63/1425; G06F 21/54; G06F 21/77
See application file for complete search history.

(56) References Cited

U.S. PATENT DOCUMENTS 6,591,393 B1 * 7/2003 Walker ................ G06F 11/1064
                                                       711/E12.043
7,069,593 B1   6/2006 Gerbault
(Continued)

FOREIGN PATENT DOCUMENTS

FR    2 785 422 A1    5/2000
FR    2 841 015 A1    12/2003

OTHER PUBLICATIONS

Feb. 6, 2015 International Preliminary Report on Patentability issued in International Application No. PCT/EP2013/064368.
(Continued)

*Primary Examiner* — Samson B Lemma
*Assistant Examiner* — Arya Golriz
(74) *Attorney, Agent, or Firm* — Oliff PLC

(57) ABSTRACT

A functional program stored in a memory area of an electronic card may be protected against an attack by disturbance of electrical origin intended to modify at least one logic state of at least one code of this program. The method may include: a storage step during which codes of the functional program and codes of a check program intended to check the logical behavior of the functional program are stored in the memory of the card; and a step of executing at least one code of the functional program followed by a step of checking the logic states of the functional program by executing the check program. During the storage step, the codes of the check program are stored in a memory area
(Continued)

formed by addresses that are defined so that the attack by disturbance of electrical origin has no influence on the logic states of this program.

7 Claims, 3 Drawing Sheets

(56) References Cited

U.S. PATENT DOCUMENTS

| | | | |
|---|---|---|---|
| 7,352,612 B2* | 4/2008 | Hamberg | G06F 12/0238 365/145 |
| 2002/0012280 A1* | 1/2002 | Yamamoto | G11C 7/14 365/200 |
| 2003/0110483 A1* | 6/2003 | Ono | G06F 11/1433 717/170 |
| 2005/0229164 A1 | 10/2005 | Giraud | |
| 2006/0277539 A1* | 12/2006 | Amarasinghe | G06F 21/53 717/168 |
| 2012/0004011 A1* | 1/2012 | Chun | G06F 11/1456 455/550.1 |
| 2012/0023285 A1* | 1/2012 | Kim | G06F 12/0246 711/103 |

OTHER PUBLICATIONS

Sep. 16, 2013 Search Report issued in International Application No. PCT/EP2013/064368 (with translation).

\* cited by examiner

METHOD FOR PROTECTING A CHIP CARD AGAINST A PHYSICAL ATTACK INTENDED TO MODIFY THE LOGICAL BEHAVIOUR OF A FUNCTIONAL PROGRAM

The present invention concerns the implementation of countermeasures intended to protect a functional program stored in a memory area of an electronic card against an attack by disturbance of electrical origin intended to modify at least one logic state of at least one code of this program.

An electronic card comprises components, such as memory blocks, which may contain codes of a so-called functional program. A functional program is here considered to be a program wherein the logic state of at least one of its codes can be modified by an attack by disturbance of electrical origin applied to a particular point of the memory on which the codes of this program are stored. Hereinafter and for reasons of concision, the expression attack will be understood to be equivalent to the expression attack by disturbance of electrical origin.

A disturbance of electrical origin is normally defined by parameters such as the electrical power, the duration of application of the disturbance or the point of attack on the card, i.e. the point on the card where this disturbance is applied.

An attack may modify logic states of program codes by physically disturbing the components of this card. These modifications will cause errors in the execution of the program codes, which questions the security of the data present on the card.

This is the case in particular with the chip of a smartcard. This is because, in this case, an attack consists of injecting energy on a precise point on the chip at a precise instant, for example via a laser. The point of attack, and the instant of the attack, are determined by the attacker so that the energy applied during this attack modifies the logic state of at least one code of a functional program stored in a particular memory area of the chip. An attack causes, for example, a modification to certain logic states of the chip or the value of a stored data item used by or resulting from the execution of at least one code of this functional program. An attack may also disturb the sequencing of the steps of a functional program so that a function of the program is not executed for example.

For each attack by disturbance of electrical origin, it is possible to experimentally determine the extent of the consequences on a smartcard. Actually, by considering two different memory addresses, each containing a code of a functional program executed at different instants, if at these two instants the application of a same disturbance of electrical origin causes a fault on these two codes of the functional program, then these two addresses are considered to belong to the same memory area, that is to say a memory area formed by addresses that are defined so that the attack by disturbance of electrical origin has an influence on the logic states of these two codes of this program.

Such a memory area may thus be, for example, a memory plane or a set of memory planes connected by a bus. This example is given here only by way of illustration and in no way limits the scope of the method.

By way of illustration, let us take the example of a functional program that consists of comparing an incoming PIN number with a reference PIN number. This functional program returns as a result the binary value 1 if the two PIN numbers are identical and the value 0 otherwise. This normal behaviour may be disturbed by an attack applied at a precise point on the chip that is in relationship with the memory area in which this functional program is stored. Thus the attack may put the result of the comparison of the PIN numbers always at the value 1 even if these PIN numbers are different.

Several attacks may be carried out on the chip either simultaneously at different points on the chip so as to modify the behaviour of several programs (they are said multiple spatial attacks), or successively so as to repeat the same attack over time (they are then said multiple temporal attacks). It is also possible to carry out spatio-temporal attacks, i.e. to carry out several simultaneous attacks at several points on the chip and to coordinate these attacks in time.

In order to protect electronic cards against attacks, and in particular smartcards, using countermeasures software, which are in the form of so-called check programs that are stored within a memory of the electronic card (in the chip of a smartcard) is well-known.

A check program checks the logical behaviour of a functional program. It may, for example, check the consistency of the logic states of the card or validate tests or check that a function that should be called by a functional program has indeed been called or that a logic state does indeed have an expected value. In the case of an abnormality (error), the check program then for example forces the card to be mute or to be blocked.

In order to counteract temporal attacks, one possible countermeasure is to repeat the execution of the same functional program. According to the example given above, this solution would consist of repeating the comparison test several times and checking that it always gives the same results. In the contrary case, the check program may find that the card has undergone an attack.

This type of countermeasure is not effective against spatial attacks or spatio-temporal attacks since the repeated tests may all give the same false results if the repetition of the attacks is sequenced with the repetition of the tests.

Through this example of a test on PIN numbers it can be seen, in general, that using a check program is not sufficient to counteract an attack since it is easy for the attacker, by using current means, to determine the precise point of an attack in order to modify the logical behaviour of the functional program as well as to counteract the check program associated with this functional program.

The problem solved by the present invention is to remedy the aforementioned drawbacks.

To this end, in general terms, the invention consists of storing the codes of the check program in a memory area formed by addresses that are defined so that an attack by disturbance of electrical origin has no influence on the logic states of this program.

In other words, if an attack by disturbance of electrical origin influences the logic states of the codes of a program stored in a memory area, then the codes of the check program are stored in a memory area that is formed by addresses that are defined so that this attack by disturbance of electrical origin has no influence on the logic states of this check program.

Thus the logical behaviour of these two programs cannot be modified by applying attacks (even multiple attacks) at a particular point on the chip. According to one of its aspects, the present invention concerns a method for protecting a functional program stored in a memory area of an electronic card against an attack by disturbance of electrical origin intended to modify at least one logic state of at least one code of this program, said method comprising:

a storage step during which codes of the functional program and codes of a check program intended to check the logical behaviour of the functional program are stored in said memory of the card, a step of executing at least one code of the functional program followed by a step of checking the logic states of the functional program by executing the check program. The method is characterised in that, during the storage step, the codes of the check program are stored in a memory area formed by addresses that are defined so that the attack by disturbance of electrical origin has no influence on the logic states of this program.

According to one embodiment, during the storage step, the codes of the functional program are stored in a first memory area and duplicated in a third memory area and the codes of the check program are stored in a second area and duplicated in a fourth memory area, said first, second, third and fourth memory areas each being formed by addresses that are defined so that an attack by disturbance of electrical origin on one of these other memory areas has no influence on the logic states of the codes of a program stored in another of these memory areas, and the step of executing at least one code of the functional program is then preceded by a step of choosing a memory area during which, firstly, a functional program is chosen randomly from those stored in the first and third memory areas, the check program executed during the check step then being either the one stored in the second memory area if the functional program chosen is the one stored in the first memory area, or the one stored in the fourth memory area if the functional program chosen is the one stored in the third memory area.

According to a variant of this embodiment, the first and fourth memory areas are one and the same memory area and the third and second memory areas are also one and the same memory area, said two single memory areas then each being formed by addresses that are defined so that an attack by disturbance of electrical origin on one of these memory areas has no influence on the logic states of the codes of a program stored in the other of these two memory areas.

According to one embodiment, during the storage step, the codes of the check program are also stored in the third memory area, said first, second and third memory areas then each being formed by addresses that are defined so that an attack by disturbance of electrical origin on one of these memory areas has no influence on the logic states of the codes of a program stored in another of these memory areas, and the check step is then preceded by a step of choosing a memory block during which a check program is randomly chosen from those stored in the second and third memory areas.

According to a variant of this embodiment, during the storage step, the codes of a program, referred to as a trap program, which is defined so as to give information on a register of the electronic card as soon as it suffers an attack by disturbance of electrical origin, are also stored both in the second memory area and in the third memory area, and if the chosen check program is the one of the second memory area, then the step of checking the consistency of said logic states is followed by a step of executing the trap program that is stored in the third memory area, and if the check program chosen is the one of the third memory area, then the step of checking the consistency of said logic states is preceded by a step of executing the trap program that is stored in the second memory area.

According to one of its hardware aspects, the present invention concerns a device for protecting a functional program stored in a memory of an electronic card against an attack by disturbance of electrical origin intended to modify at least one logic state of at least one code of this program, said device comprising:

means for storing codes of the functional program and codes of a check program intended to check the logical behaviour of the functional program in a memory of the card, means for executing at least one code of the functional program, means for checking logic states of the functional program by executing the check program.

Said device is characterised in that the means for storing the codes are configured so that the codes of the check program are stored in a memory area formed by addresses that are defined so that the attack by disturbance of electrical origin has no influence on the logic states of this program.

According to another of its hardware aspects, the present invention concerns a computer program product characterised in that it comprises instructions for carring out, by means of a device such the one above described, of the method also above mentioned when said program is executed by a processor of the device.

According to another of its hardware aspects, the present invention concerns storage means able to be read by a computer, characterised in that they store a computer program comprising instructions for the implementation, by a suitable device, of the above method when said program is executed by a processor of the above device.

The features of the invention mentioned above, as well as others, will emerge more clearly from a reading of the following description of an example embodiment, said description being given in relation to the accompanying drawings, among which:

FIGS. 2-5 give illustrations of embodiments of the method according to the present invention in which a functional program SP, a program P and a check program CP are stored. The program SP is said to be functional since the logic state of at least one of its codes may be modified by an attack by disturbance of electrical origin applied to a particular point of the memory on which the codes of this program are stored, while the program P is a program that is not functional, that is to say not sensitive to such attack. It should be noted that the term program is here used to designate both an instruction and a set of instructions. In addition, the programs SP and P may be parts of a same program. Moreover, the check program CP is used as a countermeasure for protecting the program SP against attacks.

Figure 1:
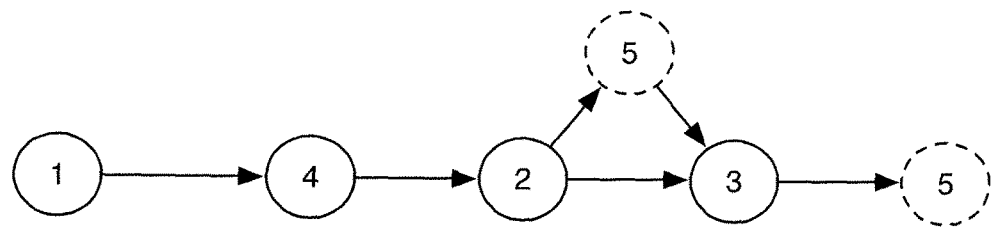
FIG. 1 depicts a diagram of the steps of the method according to the present invention.

According to FIG. 1, the method comprises a storage a step 1 during which codes of the functional program SP and codes of the check program CP are stored in the memory of the card, and a step 2 of executing at least one code of the functional program SP followed by a step 3 of checking the logic states of the functional program SP by executing the check program CP. The method can continue with the execution of the program P. However, this last execution is not an essential step of the method according to the present invention.

According to the invention, during the storage step, the codes of the check program CP are stored in a memory area formed by addresses that are defined so that the attack by disturbance of electrical origin has no influence on the logic states of this program.

Figure 2:
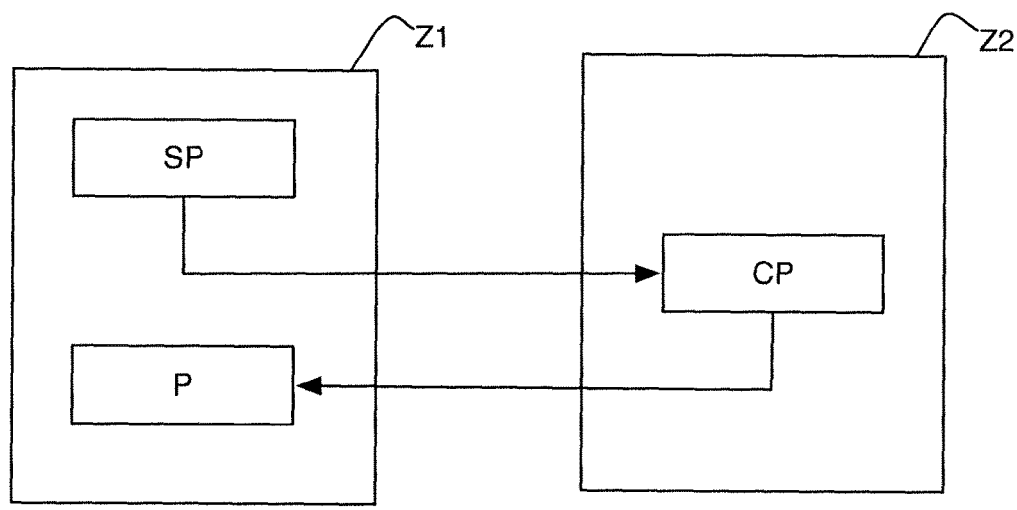
FIG. 2 illustrates an example of a first embodiment according to the present invention.

FIG. 2 illustrates a first embodiment of this method.

According to this embodiment, during the storage step 1, the functional program SP is stored in a first memory area Z1 and the check program CP is stored in a second memory area Z2. The areas Z1 and Z2 are represented here by separate rectangles in order to indicate that the memory area Z2 is formed by addresses that are defined, according to the meaning of the invention, so that an attack by disturbance of electrical origin has no influence on the logic states of the codes of the check program CP while the memory area Z1 is formed by addresses relating to program codes (here SP and P) the logic states of which may be modified by such an attack.

This embodiment enables the memory of an electronic card to be protected against temporal attacks. Actually, if the area Z1 undergoes an attack, the area Z2 will not be affected and the check program CP will act on the card following the detection of an error. Moreover, if the area Z2 undergoes an attack, the logical behaviour of the program SP will not be affected.

Figure 3:
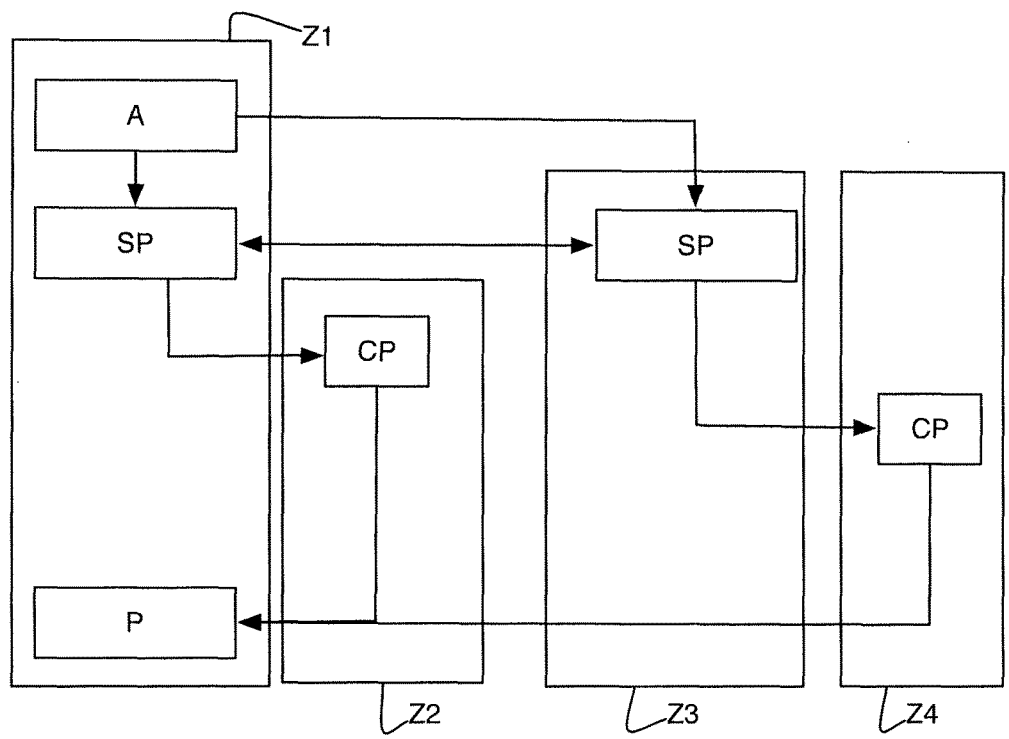
FIG. 3 illustrates an example of a second embodiment according to the present invention.

FIG. 3 illustrates a second embodiment of this method.

According to this embodiment, during the storage step 1, the codes of the functional program SP are stored in a first memory area Z1 and duplicated in a third memory area Z3 and the codes of the check program CP are stored in a second memory area Z2 and duplicated in a fourth memory area Z4. The memory areas Z1, Z2, Z3 and Z4 are each formed by addresses that are defined, according to the meaning of the invention, so that an attack by disturbance of electrical origin on one of these memory areas has no influence on the logic states of the codes of a program stored in another of these memory areas.

The method then comprises, according to this embodiment, a step 4 of choosing a memory area, said step 4 preceding step 2 of executing the functional program. Step 4 is illustrated in FIG. 3 by a functional block A stored in the area Z1. It should be noted that this functional block A may be stored on other memory areas without departing from the scope of this embodiment.

During step 4, firstly, a functional program SP is randomly chosen from those stored on the memory areas Z1 and Z3. The check program CP executed during step 3 is then either the one stored in the memory area Z2 if the chosen functional program SP in the one stored in the memory area Z1, or the one stored in the memory area Z4 if the chosen functional program is the one stored in the memory area Z3.

This embodiment enables the memory of the electronic card to be protected against temporal attacks since both the functional program and the check program are duplicated on two memory areas (defined within the meaning of the invention) and the choice of randomly using the programs stored either in one or in the other memory area makes it to be robust to repeated attacks since the probability would be low that the various successive attacks would choose always the same programs stored on the same memory areas. Actually, the failure rate of an attack depends on the number of duplications of the programs on memory areas defined within the meaning of the invention. Thus, by duplicating them once, the failure rate is 50%.

Figure 4:
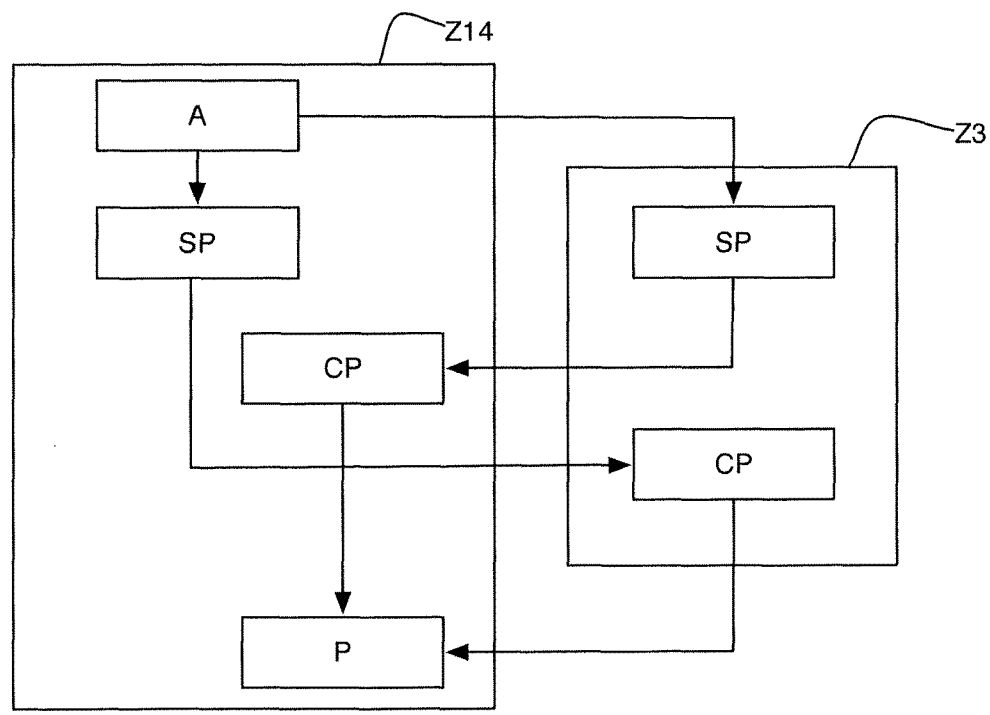
FIG. 4 illustrates an example of a variant of the second embodiment according to the present invention.

According to a variant of this embodiment illustrated by FIG. 4, the memory areas Z1 and Z4 are one and the same memory area Z14 and the memory areas Z2 and Z3 are one and the same memory area Z23, and said memory areas Z14 and Z23 are then each formed by addresses that are defined, according to the meaning of the invention, so that an attack by disturbance of electrical origin on one of these memory areas has no influence on the logic states of the codes of a program stored in the other of these two memory areas.

Figure 5:
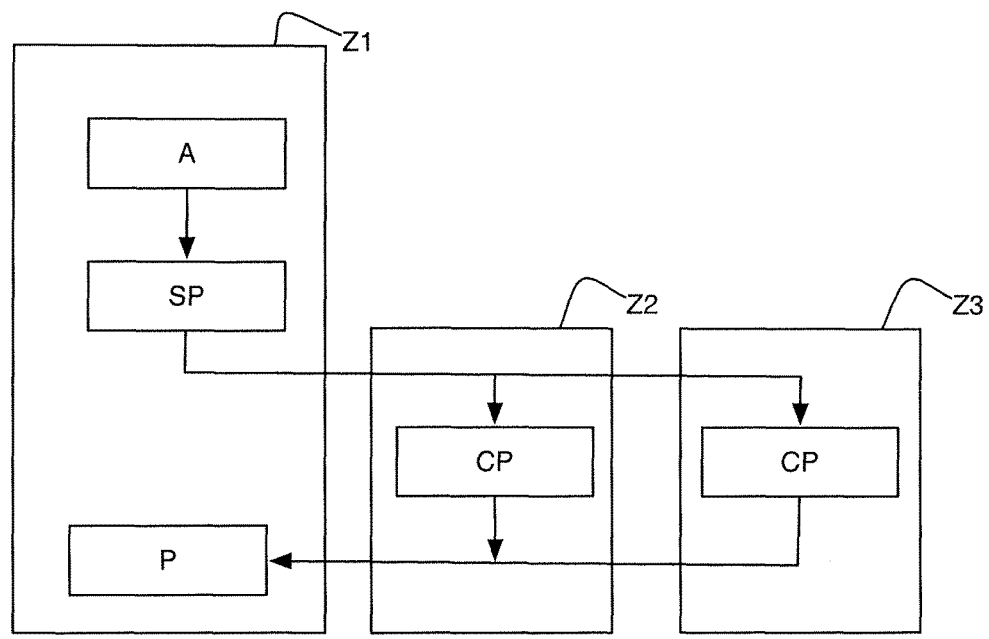
FIG. 5 illustrates an example of a third embodiment according to the present invention.

FIG. 5 illustrates a third embodiment of the method.

According to this embodiment, during the storage step 1, the codes of the check program CP are stored in a second memory area Z2 and duplicated in a third memory area Z3 while the codes of the functional program SP are stored only in a first memory area Z1. The memory areas Z1, Z2 and Z3 are then each formed by addresses that are defined, according to the meaning of the invention, so that an attack by disturbance of electrical origin on one of these memory areas has no influence on the logic states of the codes of a program stored in another of these memory areas.

The method then comprises, according to this embodiment, a step 4 of choosing a memory area that precedes the step 3 of executing the functional program. This step 4 is illustrated in FIG. 5 by a functional block A stored in the area Z1. It should be noted that this functional block A can be stored on other memory areas without departing from the scope of this embodiment.

During the step of choosing a memory block, a check program CP is randomly chosen from those stored in the memory areas Z2 and Z3.

This embodiment enables the obtained failure rates of an attack to be similar to those obtained with the second embodiment. However, this embodiment is advantageous since only the check program CP is duplicated, which limits the impact on the cost of this program in terms of size.

Figure 6:
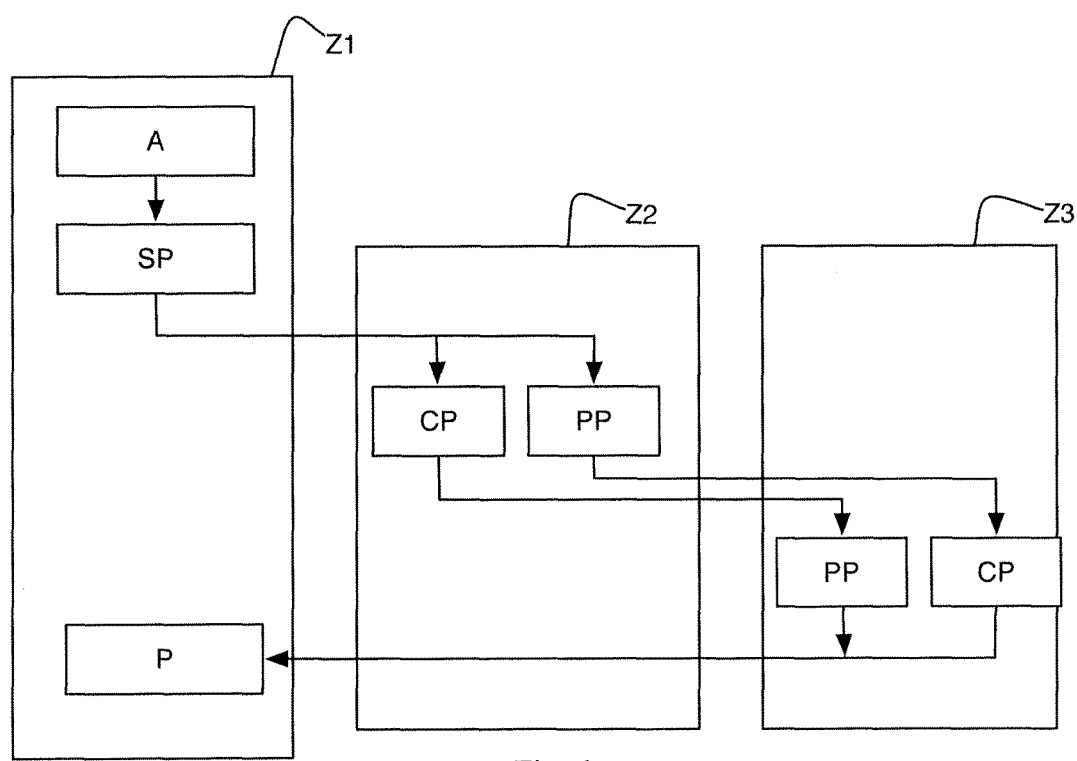
FIG. 6 illustrates an example of a variant of the third embodiment according to the present invention.

FIG. 6 illustrates a variant of the third embodiment of the method according to the present invention.

According to this variant, during the storage step 1, the codes of a program PP, referred to as a trap program, which is defined so as to detect an attack on the memory area in which it is stored, are also stored in the memory area Z2. This trap program is duplicated in the memory area Z3.

If the chosen check program CP is the one in the memory area Z2, then step 3 is followed by a step 5 of executing the trap program PP stored in the memory area Z3 and, if the chosen check program CP is the one in the memory area Z3, then step 3 is preceded by a step 5 of executing the trap program PP stored in the memory area Z2. This variant is also illustrated in FIG. 1 by the circles in dotted lines.

This variant protects the memory of the electronic card against spatio-temporal attacks since both the check program CP and the trap program PP are duplicated on two memory areas formed by addresses that are defined, according to the meaning of the invention, so that an attack by disturbance of electrical origin on one of these memory areas has no influence on the logic states of the codes of a program stored in the other one of these two memory areas, and the choice of randomly using the program stored either in one or in the other memory area enables the method to be robust against repeated attacks since the probability will be low that the various successive attacks will always choose the same programs stored on the same memory areas.

According to this variant, the functional program SP is not duplicated but the check program CP is duplicated in two memory areas as in the embodiment in FIG. 5. In addition, according to this variant, a trap program PP is introduced that checks nothing by default but enables, if it is disturbed, an attack that has been applied to the memory area where it is stored to be detected. The trap program PP then enables to a card security policy to be applied.

All or some of the methods described above can be implemented in a software form by execution of a set of instructions by a programmable machine, such as a DSP (Digital Signal Processor) or a microcontroller or be implemented in a hardware form by a machine or a dedicated component, such as an FPGA (Field-Programmable Gate Array) or an ASIC (Application-Specific Integrated Circuit).

The invention claimed is:

1. A method for executing a functional program while stored on a memory of a card, said functional program being sensitive to attacks by disturbance of electrical origin on a particular point in the memory of the card, said method comprising:
   (1) storing codes of said functional program in a first memory area of said memory of the card and storing the codes of a check program provided to check logical states of the functional program in a second memory area of said memory of the card in order to check that a function that should be called by a functional program has indeed been called or that logic states of the functional program does indeed have expected values,
   (2) duplicating the codes of the functional program in a third memory area and duplicating the codes of the check program in a fourth memory area;
   (3) executing, by at least one hardware processor or microcontroller, at least one code of the functional program, and
   (4) executing the check program in order to check logic states of the functional program so as to check the execution of said at least one code of said functional program, wherein if the check program determines an abnormality in the functional program, the check program forces the card to not execute the functional program,
   wherein said first, second, third and fourth memory areas each being formed by addresses so that an attack by disturbance of electrical origin on one of these memory areas has no influence on the logic states of the codes of a program stored in another of these memory areas, and
   wherein executing at least one code of the functional program is then preceded by randomly choosing either the functional program stored in the first memory area or the functional program stored in the third memory area, and executing the check program in the second memory area if the chosen functional program is the one stored in the first memory area, or the check program stored in the fourth memory area if the chosen functional program is the one stored in the third memory area.

2. The method according to claim 1, in which the first and fourth memory areas form one and the same memory area and the third and second memory areas also form one and the same memory area, said two single memory areas thus each being formed by addresses so that an attack by disturbance of electrical origin on one of these memory areas has no influence on the logic states of the codes of a program stored in the other of these two memory areas.

3. The method according to claim 1, further comprising storing the codes of the check program in a third memory area, said first, second and third memory areas then each being formed by addresses that an attack by disturbance of electrical origin on one of these memory areas has no influence on the logic states of the codes of a program stored in another of these memory areas, and wherein executing the check program is preceded by randomly choosing either the check program stored in the second memory area or the check program stored in the third memory areas.

4. The method according to claim 1, further comprising:
   storing the codes of a program, referred to as a trap program, in said second memory area and in said third memory area, said trap program being configured to detect an attack by disturbance of electrical origin on the memory area in which it is stored and to inform a register of the card; and
   if the chosen check program is that of the second memory area, executing the trap program stored in the third memory area after the execution of said chosen check program, and
   if the check program chosen in that of the third memory area, executing the trap program stored in the second memory area before the execution of said chosen check program.

5. A device for checking the execution of a so-called functional program sensitive to an attack by disturbance of electrical origin on a particular point of the memory in which the codes of this program are stored, said device comprising:
   at least one hardware processor or microcontroller configured for:
   storing codes of the functional program in a first memory area of said memory of the card and storing codes of a check program provided to check logical states of the functional program in a second memory area of said memory of the card in order to check that a function that should be called by a functional program has indeed been called or that logic states of the functional program does indeed have expected values,
   duplicating the codes of the functional program in a third memory area and duplicating the codes of the check program in a fourth memory area;
   executing at least one code of the functional program, and
   executing the check program in order to check logical states of the functional program so as to check the execution of said at least one code of said functional program, wherein if the check program determines an abnormality in the functional program, the check program forces the card to not execute the functional program,
   wherein said first, second, third and fourth memory areas each being formed by addresses so that an attack by disturbance of electrical origin on one of these memory areas has no influence on the logic states of the codes of a program stored in another of these memory areas, and
   wherein executing at least one code of the functional program is then preceded by randomly choosing either the functional program stored in the first memory area or the functional program stored in the third memory area, and executing the check program in the second memory area if the chosen functional program is the one stored in the first memory area, or the check program stored in the fourth memory area if the chosen functional program is the one stored in the third memory area.

6. A computer program product comprising a non-transitory computer program medium that includes codes of instructions for carrying out a method for executing a functional program while stored on a memory of a card when said computer program is executed by a hardware processor of a device of a card, said functional program being sensitive to attacks by disturbance of electrical origin on a particular point of the memory of the card; said method comprising:
- (1) storing codes of said functional program in a first memory area of said memory and storing the codes of a check program provided to check logical states of the functional program in a second memory area of said memory of the card in order to check that a function that should be called by a functional program has indeed been called or that logic states of the functional program does indeed have expected values,
- (2) executing at least one code of the functional program, and
- (3) executing the check program in order to check logic states of the functional program so as to check the execution of said at least one code of said functional program, wherein if the check program determines an abnormality in the functional program, the check program forces the card to not execute the functional program,
- wherein said first, second, third and fourth memory areas each being formed by addresses so that an attack by disturbance of electrical origin on one of these memory areas has no influence on the logic states of the codes of a program stored in another of these memory areas, and
- wherein executing at least one code of the functional program is then preceded by randomly choosing either the functional program stored in the first memory area or the functional program stored in the third memory area, and executing the check program in the second memory area if the chosen functional program is the one stored in the first memory area, or the check program stored in the fourth memory area if the chosen functional program is the one stored in the third memory area.

7. A non-transitory computer-readable storage means that stores a computer program comprising codes of instructions for carrying out a functional program while stored on a single memory of a given type of a card when said computer program is executed by a hardware processor of a device of a card, said functional program being sensitive to attacks by disturbance of electrical origin on a particular point in the single memory of the card said method comprising:
- (1) storing codes of said functional program in a first memory area of said single memory of the card and storing the codes of a check program provided to check logical states of the functional program in a second memory area of said single memory of the card in order to check that a function that should be called by a functional program has indeed been called or that logic states of the functional program does indeed have expected values,
- (2) executing at least one code of the functional program, and
- (3) executing the check program in order to check logic states of the functional program so as to check the execution of said at least one code of said functional program, wherein if the check program determines an abnormality in the functional program, the check program forces the card to not execute the functional program,
- wherein said first, second, third and fourth memory areas each being formed by addresses so that an attack by disturbance of electrical origin on one of these memory areas has no influence on the logic states of the codes of a program stored in another of these memory areas, and
- wherein executing at least one code of the functional program is then preceded by randomly choosing either the functional program stored in the first memory area or the functional program stored in the third memory area, and executing the check program in the second memory area if the chosen functional program is the one stored in the first memory area, or the check program stored in the fourth memory area if the chosen functional program is the one stored in the third memory area.

* * * * *